United States Patent
Iwama

(10) Patent No.: US 8,789,811 B2
(45) Date of Patent: Jul. 29, 2014

(54) WIRE PULLER

(76) Inventor: Tamotsu Iwama, Kadoma (JP)

(*) Notice: Subject to any disclaimer, the term of this patent is extended or adjusted under 35 U.S.C. 154(b) by 442 days.

(21) Appl. No.: 13/187,430

(22) Filed: Jul. 20, 2011

(65) Prior Publication Data

US 2012/0012799 A1 Jan. 19, 2012

Related U.S. Application Data

(63) Continuation of application No. PCT/JP2009/061906, filed on Jun. 30, 2009.

(51) Int. Cl.
*B63B 35/03* (2006.01)

(52) U.S. Cl.
USPC .......................... 254/134.3 R; 254/134.3 FT

(58) Field of Classification Search
USPC ....... 254/134.3 FT, 134.3 R, 134.3 SC, 134.5
See application file for complete search history.

(56) References Cited

U.S. PATENT DOCUMENTS

| | | | | |
|---|---|---|---|---|
| 6,729,606 | B1* | 5/2004 | Durin | 254/395 |
| 7,219,396 | B2* | 5/2007 | Hsieh | 24/68 R |
| 2006/0005359 | A1* | 1/2006 | Chang | 24/68 CD |
| 2006/0277726 | A1* | 12/2006 | Hsieh | 24/68 R |
| 2009/0106957 | A1* | 4/2009 | Chang | 24/68 CD |

FOREIGN PATENT DOCUMENTS

| | | |
|---|---|---|
| JP | 52-146720 | 11/1977 |
| JP | 60-078364 U | 5/1985 |
| JP | 05(1993)-025819 Y | 6/1993 |
| JP | 05(1993)-055712 U | 7/1993 |

OTHER PUBLICATIONS

PCT Application No. PCT/JP2009/061906, International Search Report Aug. 18, 2009.
PCT Application No. PCT/JP2009/061906, Written Opinion dated Aug. 18, 2009.
JP Application No. 2011-520695, Office Action dated Apr. 24, 2013 (English translation).
TW Application No. 098128975, Office Action dated Feb. 27, 2013 (English translation).

* cited by examiner

*Primary Examiner* — Lee D. Wilson
*Assistant Examiner* — Nirvana Deonauth
(74) *Attorney, Agent, or Firm* — Larry E. Henneman, Jr.; Gregory P. Gibson; Henneman & Associates, PLC

(57) ABSTRACT

[Problem]
A conventional wire puller is heavy in order to have enough rigidity.
[Solution]
Unlike the conventional wire puller having a guide part, the wire puller of the present invention has a guide part of a corded member formed integral with a frame board by folding an entrance side end of the corded member of the frame board in the direction for narrowing gap therebetween. Therefore, the wire puller of the present invention not only can reduce the number of parts but also can be decreased in weight.

9 Claims, 9 Drawing Sheets

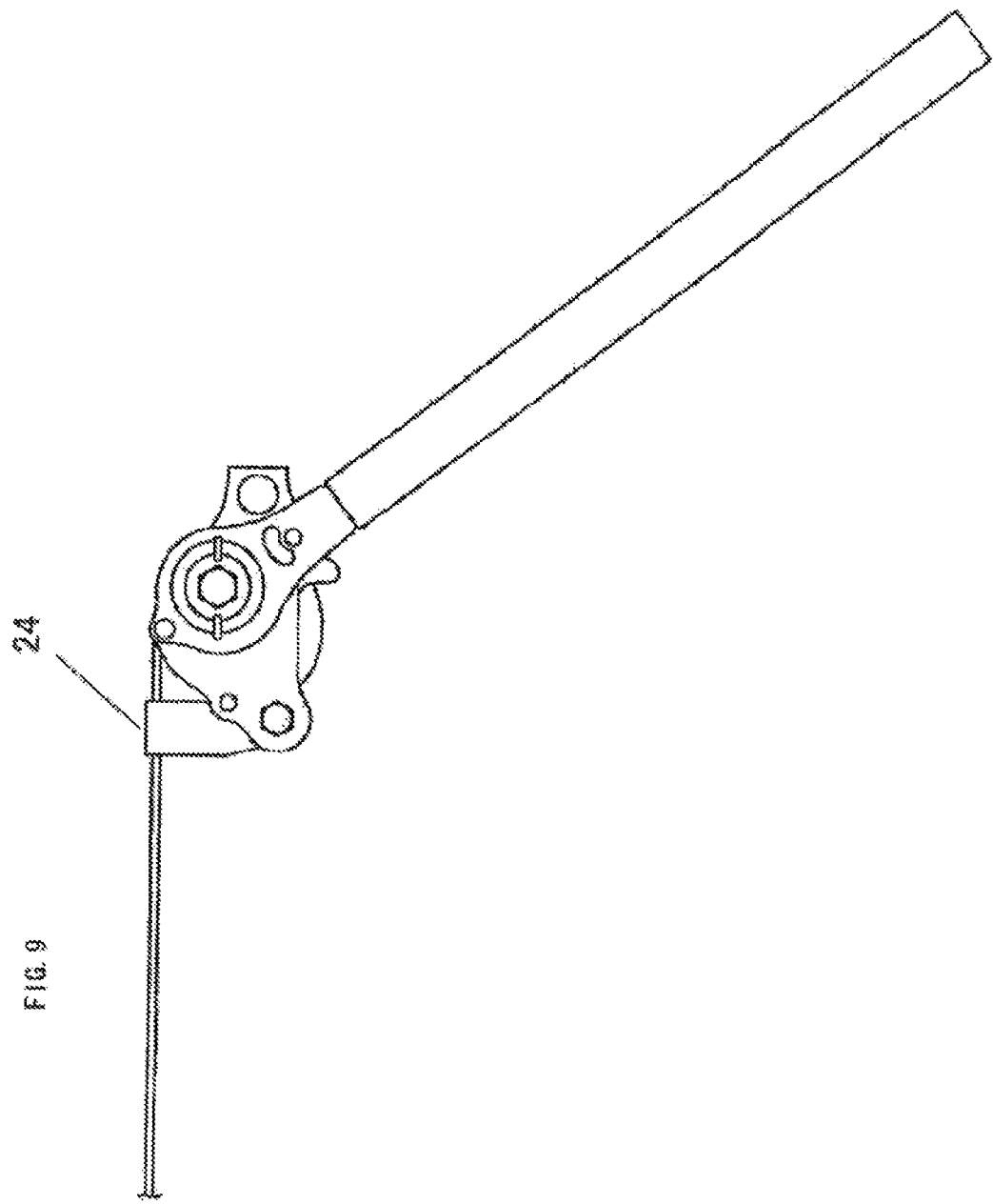

WIRE PULLER

RELATED APPLICATIONS

This application is a continuation under 35 U.S.C.§120, as authorized by 35 U.S.C.§365(c), of co-pending International Application No. PCT/JP2009/061906, filed on Jun. 30, 2009 by the same inventor (published under PCT Article 21(2) in Japanese and not English), the entire content and disclosure of which is incorporated herein by reference.

BACKGROUND

1. Field of the Invention

The present invention relates to a wire puller used for pulling wires to set tight a linear object such as an electric wire.

2. Description of the Background

A method of set tight an overhead wire between utility poles etc. firstly secures a body of the wire puller described in Japan Utility Model H5-25819 to an utility pole, then couples the wire puller to a wire grip via a wire etc. so that the coupled wire grip can grip a free end of the overhead wire. Then, the method includes operating a ratchet handle of the wire puller body and winding the wire etc. on the wire puller body so that the free end of the overhead wire is pulled toward the utility pole and supported.

That is, it is necessary for a wire puller to wind a wire etc. connected with a wire puller to pull the overhead wire and it requires all the parts of the wire puller to have high rigidity because a strong reaction force against the pulling is applied to the wire puller at the time of the winding. In order to have high rigidity required for each member of the wire puller, the wire puller should also inevitably be heavy. However, workers pull wires by hands in a high place such as a top part of the utility pole and thus the increase in weight of the wire puller may lead to lowering their work efficiency.

Practically, construction work of an overhead wire attaches a wire puller and a wire grip to an utility pole, grips the overhead wire by the wire grip, hauls the wire grip gripping the overhead wire by the wire puller, and sets tight the overhead wire while pulling it. Therefore, the workers need to raise a heavy wire puller to the top part of the utility pole and also to work using the heavy wire puller on shaky scaffolding in a high place. The work using such heavy wire puller not only reduces the working efficiency but also involve much danger. For these reason, reduction in weight of a wire puller has been desired from a viewpoint of improvement in working efficiency and workers' safety.

FIG. 9 shows an example of a conventional wire puller. The wire puller shown in the FIG. 9 comprises a wire guide part (24) in nearly a horseshoe shape to guide the wire at the time of the winding so that the wire is uniformly wound. However, there was a problem that the number of parts and the number of assembly processes increased if the wire guide part was provided. Additionally, as reduction in weight of the wire puller have been required as mentioned above, an another problem was that the wire puller needed a wire guide part (24) and a joint to support the wire guide part, resulting in increase in weight of the wire puller.

PROBLEM(S) TO BE SOLVED BY THE INVENTION

Then, the present invention is to provide a wire puller that can not only decrease the number of parts and the number of assembly processes but also reduce its weight while maintaining its rigidity, and that can improve working efficiency and safety at the time of the winding.

SUMMARY

The present invention consists of the following structures, in order to solve the above-mentioned problems. A wire puller according to an embodiment of the invention comprises a body part having a pair of frame boards arranged face to face, a wind-up drum rotatably supported in a gap between the pair of frame boards, a wind-up means to rotate the wind-up drum, and a corded member attached to the wind-up drum so that the member can be wound, wherein the body part has a pair of guide parts to guide wind-up of the corded member, and wherein the guide parts are formed so that an entrance side end of the corded member of the frame boards is folded in the direction for narrowing the gap.

A wire puller according to another embodiment of the invention comprises a body part having a pair of frame boards arranged face to face, a wind-up drum rotatably supported in a gap between the pair of frame boards, a wind-up means to rotate the wind-up drum, and a corded member attached to the wind-up drum so that the member can be wound, wherein the body part has a pair of guide parts to guide wind-up of the corded member, and wherein the guide parts are formed so that a roller is attached to an entrance side end of the corded member of the frame boards.

Furthermore, in a particular embodiment, the pair of guide parts of the wire puller of the present invention comprises increased-width parts that have a gap therebetween broadening gradually as the pair of guide parts moves away from an approach part of the corded member.

Furthermore, the guide parts of the wire puller of the present invention can be inclined to the direction of their movement in winding the corded member, as the guide parts move away from the approach part.

EFFECT OF THE INVENTION

According to the present invention, a wire puller comprises a body part having a pair of frame boards arranged face to face, a wind-up drum rotatably supported in a gap between the pair of frame boards, a wind-up means to rotate the wind-up drum, and a corded member attached to the wind-up drum so that the corded member is wound, wherein the body part has a pair of guide parts to guide wind-up of the corded member, and wherein the guide parts are formed so that an entrance side end of the corded member of the frame boards is folded in the direction for narrowing the gap, allowing the guide part to uniformly wind up the corded member without using a separate member to guide the corded member. Therefore, the wire puller according to the present invention has the advantage that the number of parts and the number of assembly processes can be decreased with compared to those of conventional products. Additionally, the wire puller according to the present invention can maintain the rigidity of a body part of a wire puller and be downsized and reduced in weight. Using the lighter wire puller according to the present invention provides an effect that can improve working efficiency and ensure safety of workers on the top of utility pole etc.

According to another embodiment of the present invention, the wire puller comprises a body part having a pair of frame boards arranged face to face, a wind-up drum rotatably supported in a gap between the pair of frame boards, a wind-up means to rotate the wind-up drum, and a corded member attached to the wind-up drum so that the member can be wound up, wherein the body part has a pair of guide parts to guide wind-up of the corded member, and wherein the guide parts are formed so that a roller is attached to an entrance side end of the corded member of the frame boards, allowing the guide parts to uniformly wind up the corded material to guide it. The wire puller according to the present invention can be reduced in weight. Using the wire puller according to the present invention provides an effect that can improve working efficiency and ensure safety of workers on the top of utility pole etc.

According to a particular embodiment of the invention, a pair of guide parts comprises increased-width parts that have a gap therebetween broadening gradually as the pair of guide parts moves away from an approach part of the corded member, allowing the guide parts to uniformly wind up the corded member along the increased-width parts when the corded member becomes loose. Therefore, it provides an effect resulting in improvement of safety of workers on the top of utility poles etc.

According to another particular embodiment of the present invention, the guide parts are inclined to the direction of their movement in winding the corded member, as the guide parts move away from the approach part, broadening a range of the guide parts to contact with the corded member and preventing the corded member from significantly swinging outward.

BRIEF DESCRIPTION OF THE DRAWINGS

FIG. 9 shows a side view of a conventional wire puller.

DETAILED DESCRIPTION

Figure 1:
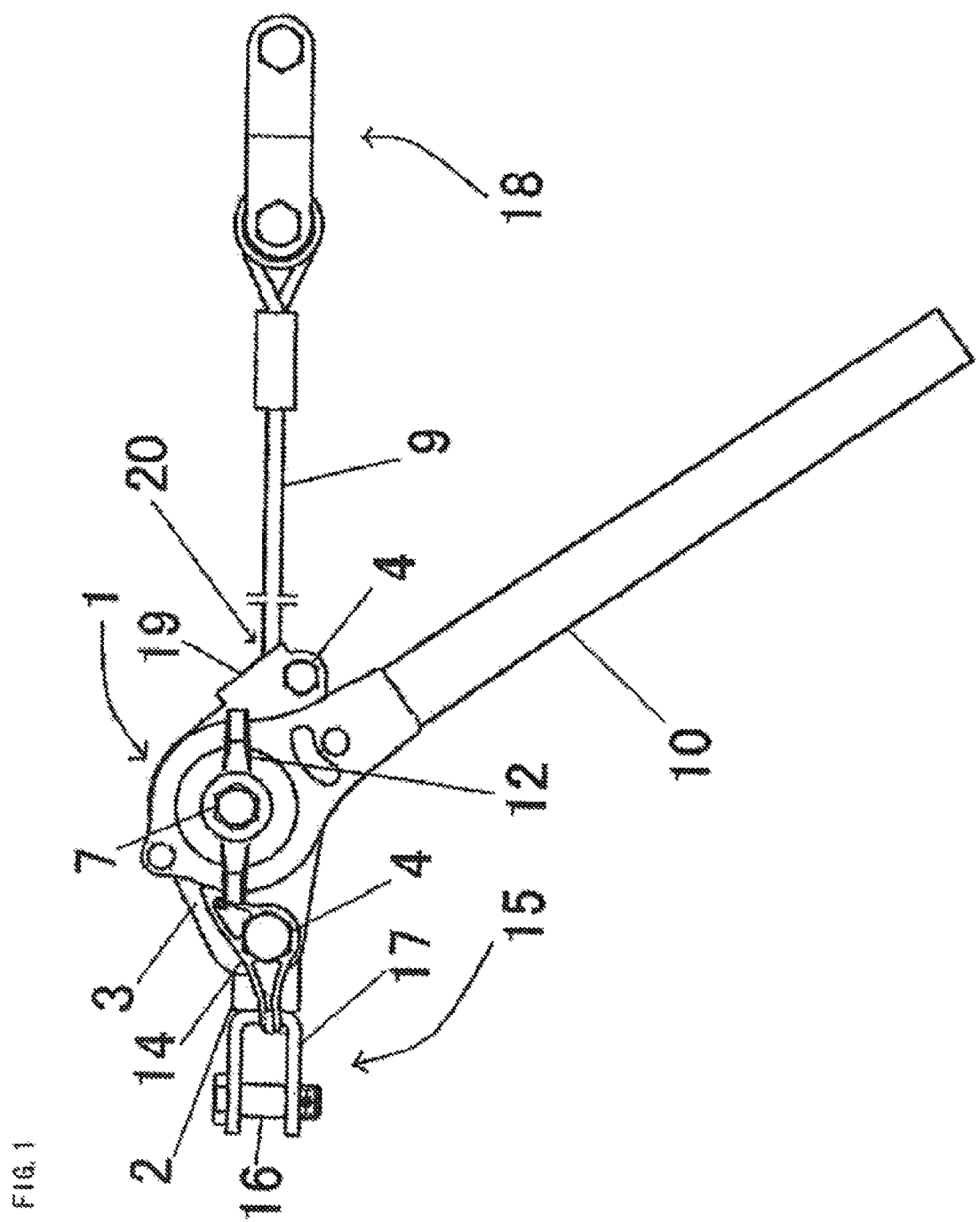
FIG. 1 shows a front view of a wire puller according to the present invention.
Figure 2:
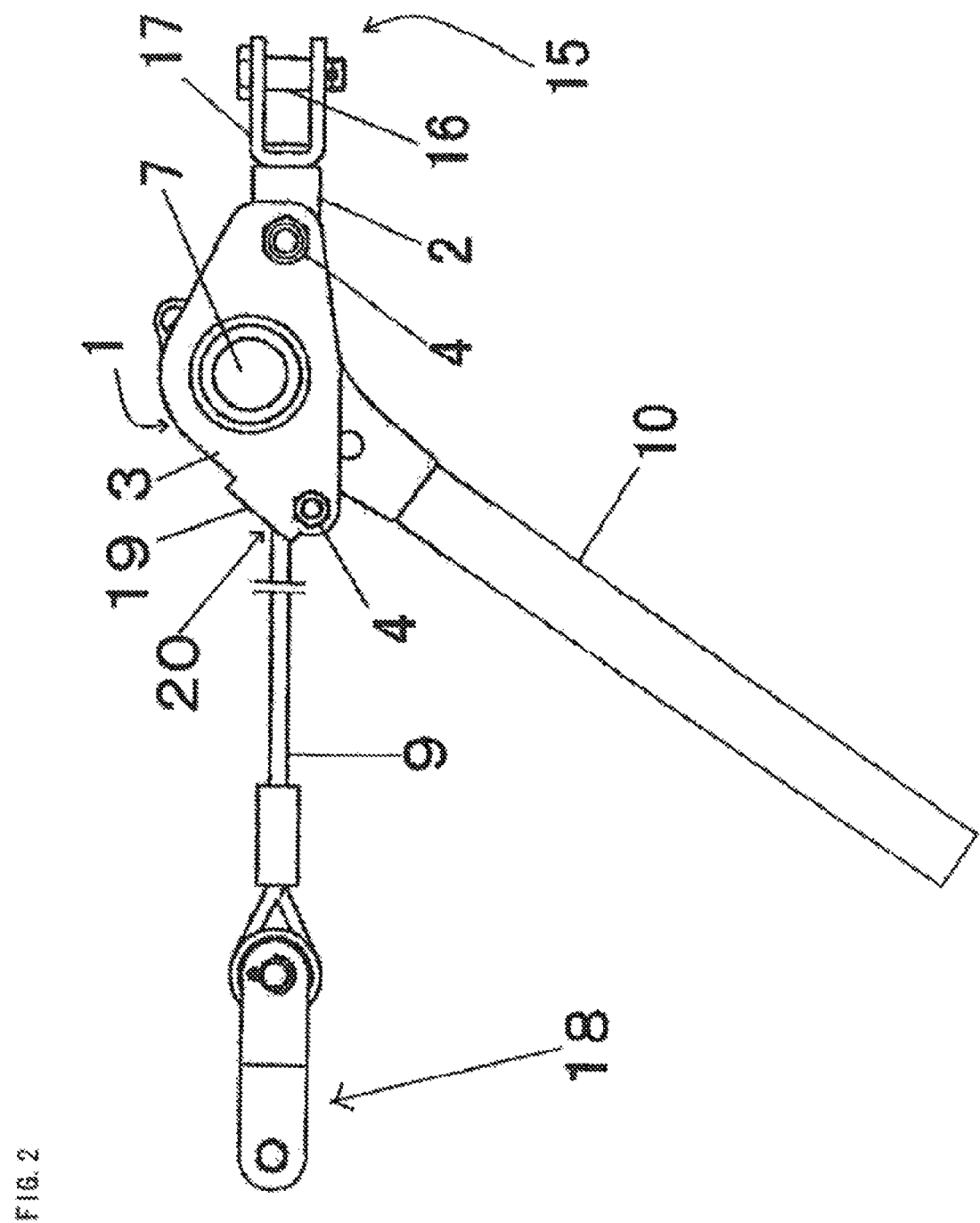
FIG. 2 shows a rear view of a wire puller according to the present invention.
Figure 3:
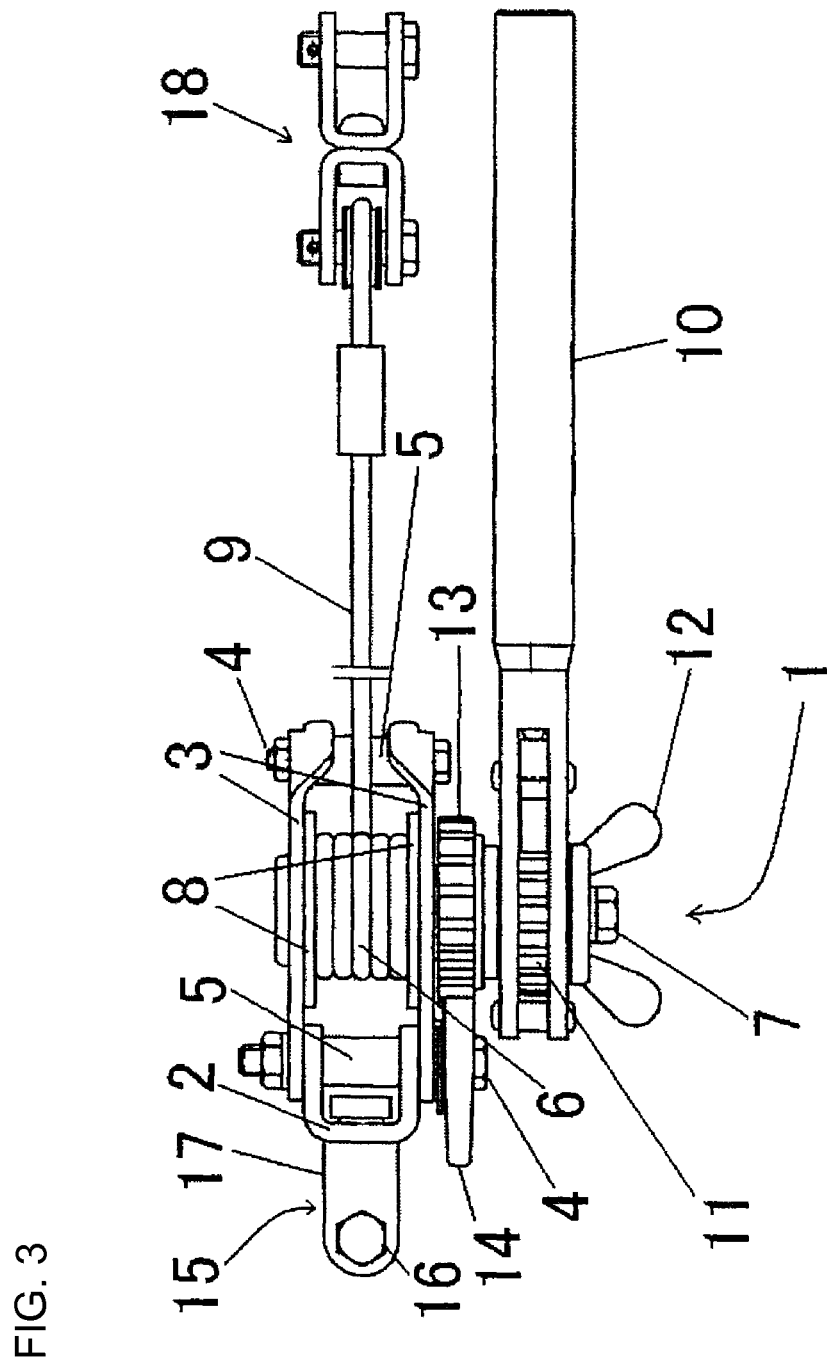
FIG. 3 shows a top view of a wire puller according to the present invention.
Figure 4:
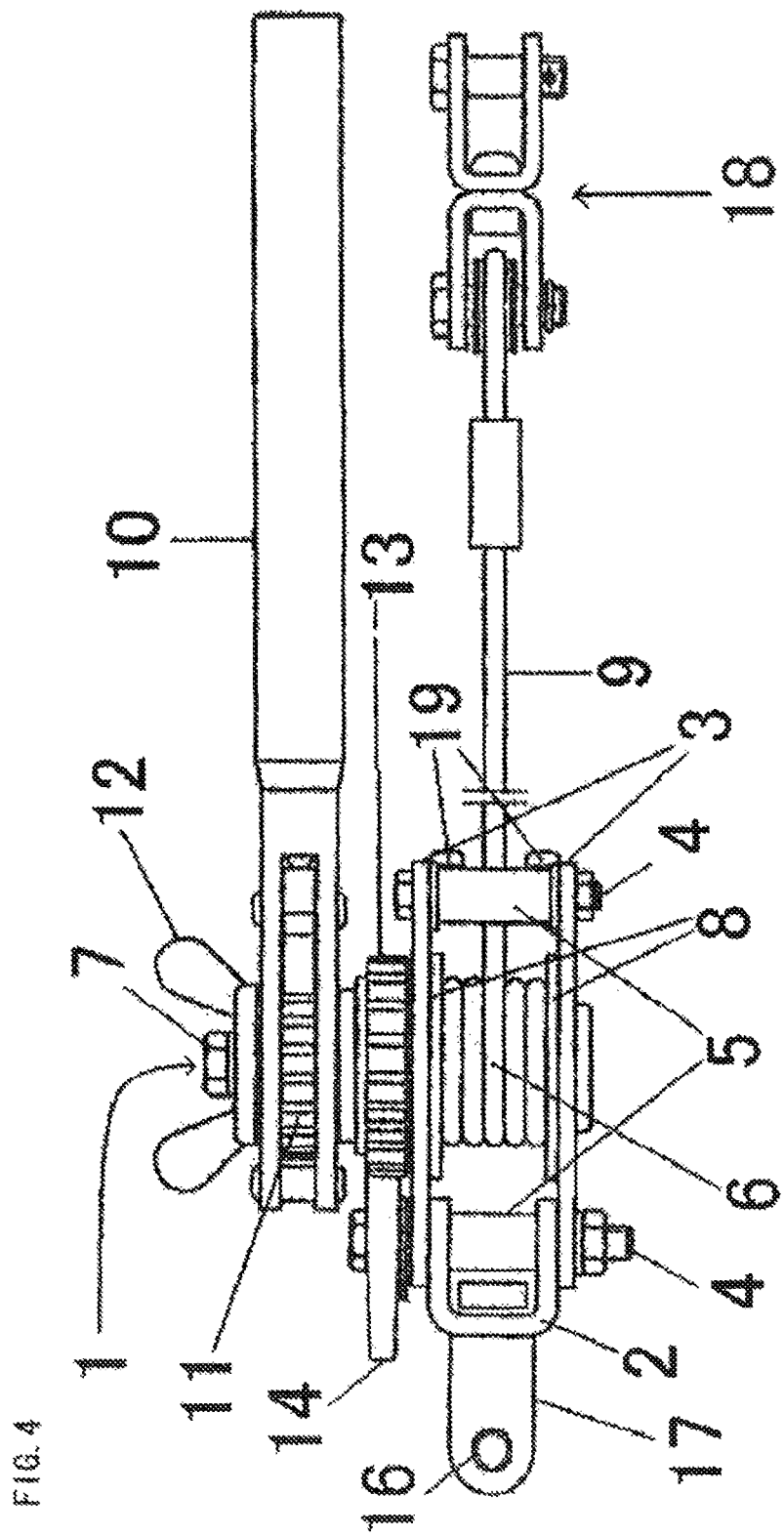
FIG. 4 shows a bottom view of a wire puller according to the present invention.
Figure 5:
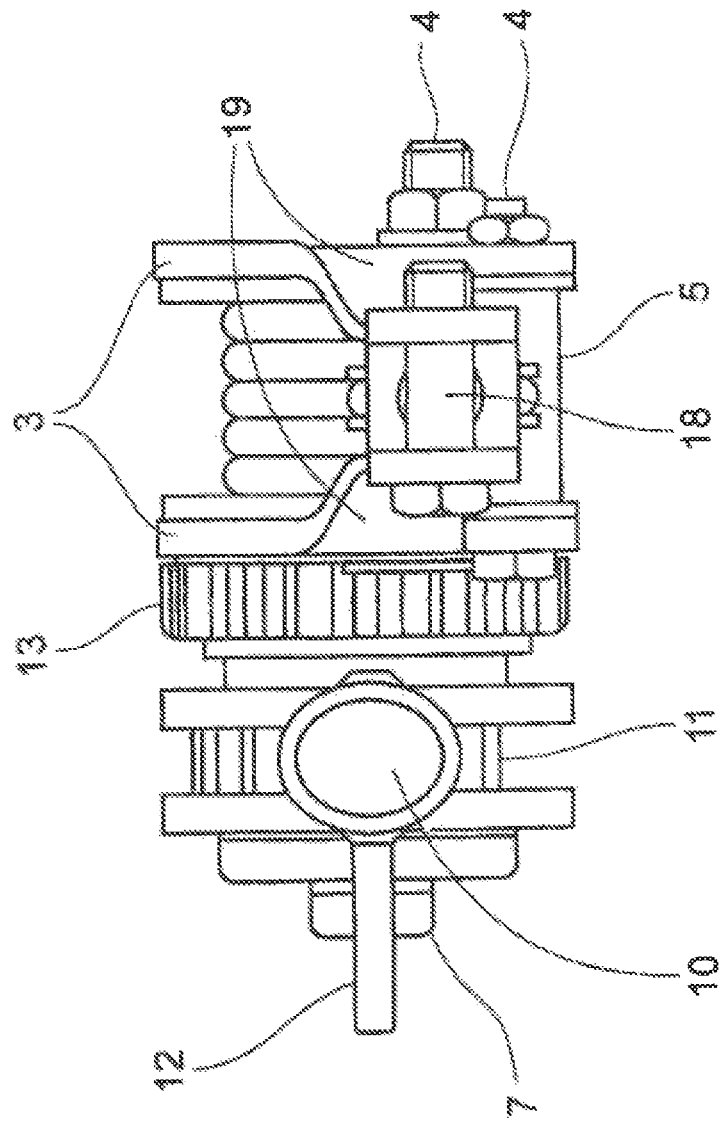
FIG. 5 shows a right side view of a wire puller according to the present invention.
Figure 6:
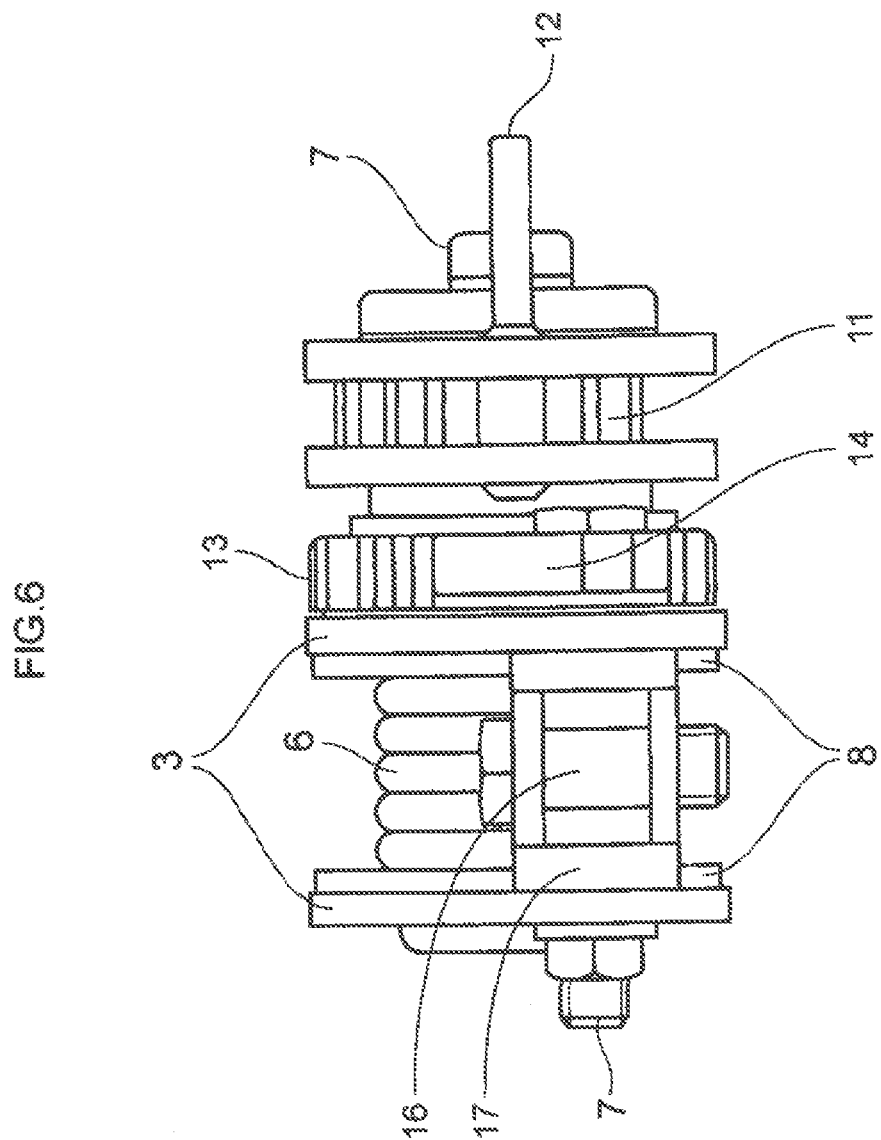
FIG. 6 shows a left side view of a wire puller according to the present invention.

Hereafter, an embodiment of the wire puller in the present invention is explained in detail based on the drawings FIGS. 1-6 show one embodiment of the wire puller in the present invention. The wire puller in the present invention comprises a body part (1), a wind-up drum (6) rotatably attached to the body part (1), a wind-up means to rotate the wind-up drum, and a corded member (9) attached to the wind-up drum so that the member (6) can be wound.

The body part (1) comprises a pair of frame boards (3) arranged face to face. A pair of frame boards (3) is integrated with a fixed axis (4) inserted in one end and the other end of the frame board, respectively.

A cylindrical spacer (5) is fit onto the each of the fixed axes (4), and these spacers (5) form a predetermined gap between a pair of frame boards (3).

The nearly horseshoe-shaped frame (2) is attached to one end of the pair of frame boards (3). The frame body (2) is rotatably attached in the gap of the pair of frame boards (3) by inserting the right side of the fixed axis (4) into its open end.

The wind-up drum (6) is rotatably supported in the gap of the pair of frame boards (3), and a main axis (7) is inserted in the center of the drum. The wind-up drum (6) is provided with a circular sideboard (8) at each ends, and a corded member (9) is attached to the surface (peripheral surface) so that the corded member is wound. The main axis (7) penetrates the pair of the frame boards (3), and the wind-up means is attached to the one end.

A handle part (10) is attached as a wind-up means for unreeling and winding a corded member (9) by rotating the wind-up drum at the external surface side of one frame board (3). The handle part (10) is attached to a base end of the main axis (6) via a ratchet mechanism (11). Unreel and wind of the corded member (9) can be achieved by winding the butterfly screw (12) as a second wind-up means, without using the handle part (10). This handle part (10) may be coated with a synthetic resin having an electrical insulation property, and, may be wholly formed in a synthetic resin for reducing the weight.

A brake gear (13) is fixed and attached between the ratchet mechanism (11) and the frame board (3). A stopper (14) is arranged to engage with this brake gear (13), and pivotally attaches the frame boards (3) to the fixed axis (4). Therefore, the stopper (14) prevents the wind-up drum (6) from rotating in the unreel direction. The brake gear (13) provides a braking force with the main axis (7) by operating a spring washer, a brake plate (not shown), etc.

A Joint metal fitting (15) is attached in the penetration hole provided on the frame body (2). This joint metal fitting (15) comprises an axial part (16) and horseshoe-shaped metal fitting that wind up a rope etc. coupled to a support such as utility poles. The joint metal fittings (15) may be slidably attached to the frame body (2) via a spring mechanism.

A connection metal fitting (18) is provided to the one end of the corded member (9) unreeled from the wind-up drum (6), wherein the corded member (9) is connected to a wire grip (not shown) for gripping a linear object via the connection metal fitting (18). When the corded member (9) is wound by the wind-up drum (6), the wire grip is drawn toward the wire puller body (1), thereby the tension applied to the linear object is increased. On the contrary, when the cord member (9) is unreeled, the wire grip is separately placed from the wire puller body (1), thereby the tension is applied to the linear object is decreased. The corded members (9) used by the present invention may be a belt, a rope, etc. although the wire is shown in FIG. 1-6.

A symmetrical pair of the frame boards (3) for the body part (1) comprises a guide part (19) to guide the winding of the corded members (9) at an end attached to the joint metal fitting (15) and the opposed end (entrance side end of the corded member). This guide part (19) is formed by folding a pair of the frame boards (3) in the direction narrowing the gap therewith. When the corded member (9) is wound by the wind-up drum (6), the guide part (19) integrally formed with this frame board (3) enables the wind-up drum (6) to wind the corded member evenly without using another conventional member (a wire guide) for guiding the corded member. The guide part (19) used in the present invention is formed by folding the frame board (3) as shown in FIGS. 1-6, also, it may formed by attaching a roller to the frame board (3).

Since the guide part (19) is formed to integrate with the frame board (3) of the body part (1), the number of members and the number of assembly processes are reduced compared with those of the conventional wire puller. Further, the integral formation of the guide part (19) with the frame board (3) has an advantage to enhance the rigidity of a guide part (19).

As mentioned above, since the wire puller in the present invention does not need the wire guide with which the conventional wire puller was provided, the frame board in the wire puller body is compactly configured, so that the wire puller can be formed in a reduced weight. Therefore, the workers can operate in the high place easily, and the working efficiency will be increased. Further, the smooth operation in the high place improves the worker's safety.

Figure 7:
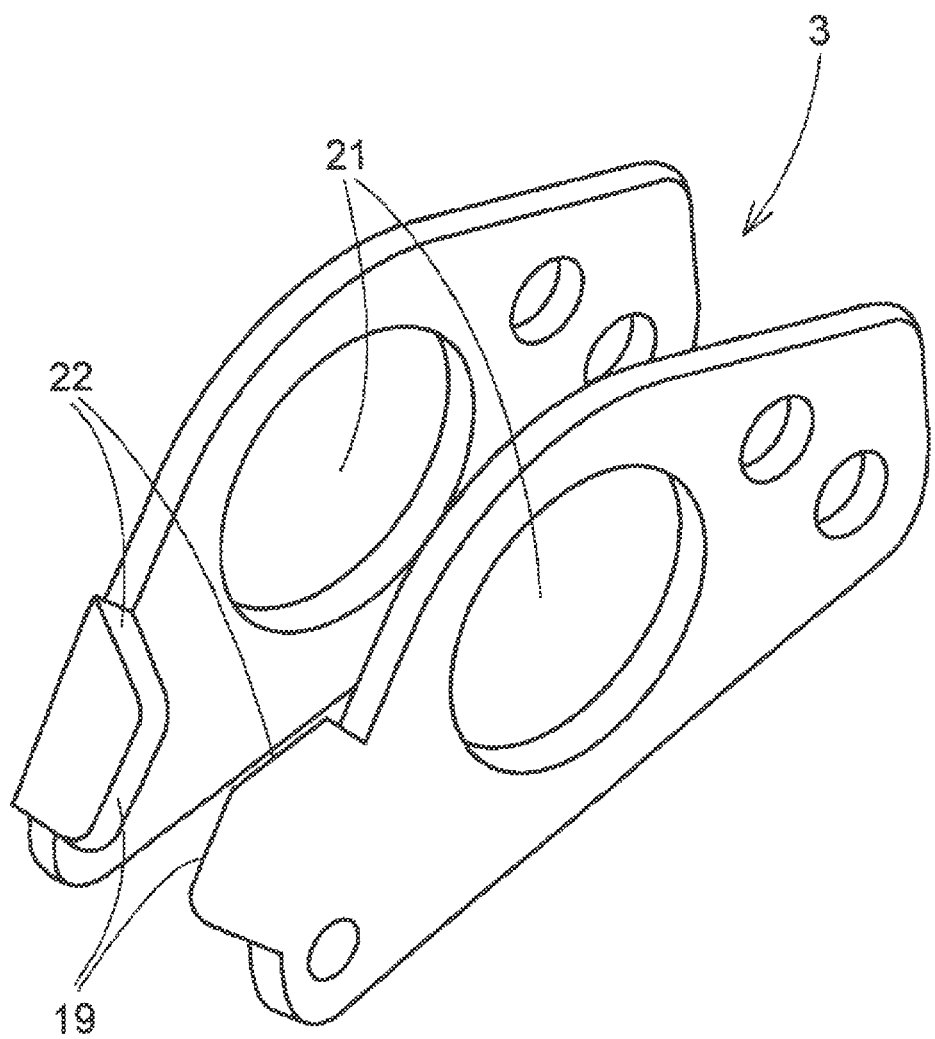
FIG. 7 shows a perspective view of a frame board of a wire puller according to the present invention.

FIG. 7 is a perspective view showing a pair of the frame boards (3). A pair of frame boards (3) consists of substantially-triangle shaped plates placed to set gaps therebetween, and the penetration hole (21) in which a main axis (7) is inserted is formed in the center of the frame boards (3). The guide part (19) is formed by folding the left oblique line part of the frame board (3).

The shape of the guide part is not limited, but preferably a pair of the guide part (19) is formed to have increased-width parts (22) that have gap therebetween broadening gap as the pair of guide members moves away from the approach part (20) of the corded member. The approach part (20) of the corded member (9) means the portion where the corded member (9) approaches to the body part (1), when the corded member (9) is wound by the wind-up drum (6). More specifically, the gap in the pair of the guide parts (19) is formed to have a predetermined width from the lower end to the middle part (lower range), and is shaped to have the width gradually increasing from the middle part to the upper end (upper range), which refers to an increased-width part (22). From the lower end, the corded member (9) is entered between the pair of the guide parts (19) at the time of winding. The shape of the guide part (19) enables to evenly wind the corded member along the increased-width part, which improves the work efficiency of the workers at high places.

The guide part (19) is inclined to the direction that the corded member is wound, because it is formed at oblique line part in the frame board (3). The incline enables the corded member (9) to contact with the guide part (19) in a wider range, so that the corded member (9) can be evenly wound and prevent the cord from swinging outside at the time of the winding. Further, it greatly dedicates to a compact configuration and a reduced weight of the wire puller. Therefore, the working efficiency of the operators will be improved and the safety of the workers will be obtained.

Figure 8:
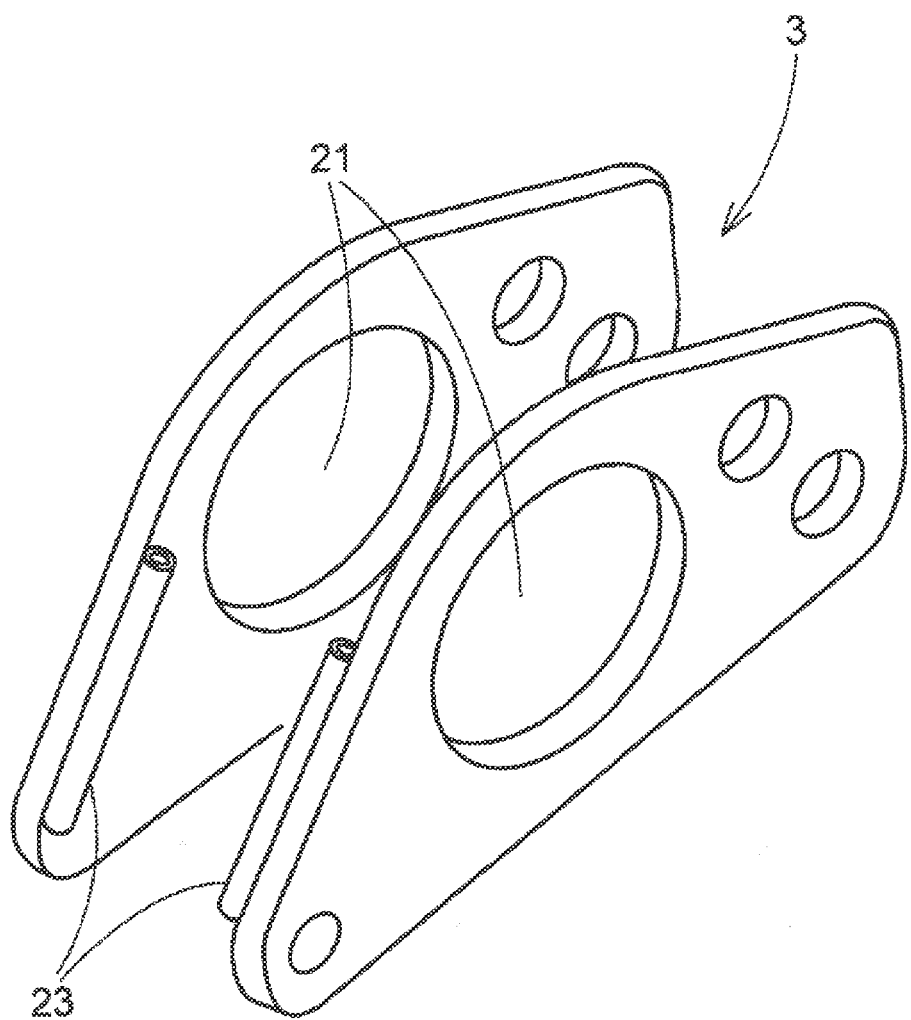
FIG. 8 shows a perspective view of a frame board having a roller of a wire puller according to the present invention.

FIG. 8 is a perspective view showing a pair of frame boards (3) for using a roller (23) as a guide part (19). The pair of frame boards (3) consists of substantially-triangle shaped plates placed to set gaps therebetween, and the penetration hole (21) in which a main axis (7) is inserted is formed in the center of the frame boards. The roller (23) functions as the guide part (19), and is rotatably arranged inside the left oblique line part of the frame board (3). The roller (23) is attached to the frame board (3), so that the rotation axis is set parallel to the left oblique line part of a frame board (3). The cord member (9) enters to the gap between the pair of the roller (23) at the time of winding. Then, the roller (23) rotates inwardly when the corded member (9) contacts to the roller (23), which smoothly guide the corded member (9). Due to the roller (23), the corded member (9) can be evenly wound and prevents the cord from swinging outside at the time of the winding.

The gap between the rollers (23) shown in the FIG. 8 has a predetermined width from the lower end to the upper end. It is also possible to set the gap formed in a predetermined width from the lower end to the middle part (lower range), and the gap is shaped to have a width gradually increasing from the middle part to the upper end (upper range), which refers to an increased-width part.

INDUSTRIAL APPLICABILITY

The present invention is preferably applicable to pulling wires, for instance, an electric wire such as power line, or communication line; wire used for elevators; and a linear object such as a chain.

DESCRIPTION OF SYMBOLS

1 . . . wire puller body
2 . . . Frame body
3 . . . Frame board
4 . . . Fixed axis
5 . . . Spacer
6 . . . Wind-up drum
7 . . . main axis
8 . . . Circular side board
9 . . . Corded member
10 . . . Handle part
11 . . . Ratchet mechanism
12 . . . Butterfly screw
13 . . . Brake gear
14 . . . Stopper
15 . . . Joint metal fitting
16 . . . Axial part
17 . . . horseshoe-shaped metal fittings
18 . . . Connecting metal fitting
19 . . . Guide part
20 . . . Approaching part
21 . . . Penetration hole
22 . . . Increased-width part
23 . . . Wire guide member

I claim:

1. A wire puller comprising:
a body part having a pair of oppositely facing frame boards; a wind-up drum rotatably supported in a gap between said pair of frame boards; a wind-up mechanism to rotate said wind-up drum; and a corded member attached to said wind-up drum so that said corded member can be wound; and wherein said body part has a pair of guide parts near an entrance side end of said pair of frame boards to guide the wind-up of said corded member; and said pair of guide parts are formed by folding a portion of each of said frame boards in a direction such that said gap between said pair of frame boards is narrower, but not closed, near said entrance side end of said pair of frame boards than at other positions along said pair of frame boards.

2. A wire puller comprising: a body part having a pair of oppositely facing frame boards; a wind-up drum rotatably supported in a gap between said pair of frame boards; a handle coupled to said wind-up drum and configured to rotate said wind-up drum; and a corded member attached to said wind-up drum so that said corded member can be wound around said wind-up drum when said wind-up drum is rotated by said handle; and wherein said body part has a pair of guide parts near an entrance side end of said pair of frame boards to guide the wind-up of said corded member; and said pair of guide parts includes at least one roller attached near said entrance side end of said frame boards.

3. The wire puller according to claim 1, wherein each of said pair of guide parts includes a portion that increases in width such that said gap near said entrance side end of said pair of frame boards broadens gradually in the direction of said wind-up drum.

4. The wire puller according to claim 2, wherein said pair of guide parts comprises increasing-width parts such that said gap near said entrance side end of said pair of frame boards broadens gradually in the direction of said wind-up drum.

5. The wire puller according to claim 1, wherein said guide parts are inclined with respect to the path of said corded member between said frame boards.

6. The wire puller according to claim 2, wherein said guide parts are inclined with respect to the path of said corded member between said frame boards.

7. The wire puller according to claim 3, wherein said guide parts are inclined with respect to the path of said corded member between said frame boards.

8. The wire puller according to claim 4, wherein said guide parts are inclined with respect to the path of said corded member between said frame boards.

9. A wire puller comprising:
- a body part having a pair of oppositely facing frame boards;
- a wind-up drum rotatably supported in a gap between said pair of frame boards;
- means for rotating said wind-up drum; and
- a corded member attached to said wind-up drum so that said corded member can be wound; and
- means, coupled to said pair of frame boards, for guiding the wind-up of said corded member near an entrance side end of said pair of frame boards.

* * * * *